(12) United States Patent
Fujimoto et al.

(10) Patent No.: US 9,944,034 B2
(45) Date of Patent: Apr. 17, 2018

(54) METHOD OF FORMING TOPPING SHEET AND APPARATUS THEREOF

(71) Applicant: TOYO TIRE & RUBBER CO., LTD., Osaka-shi, Osaka (JP)

(72) Inventors: Masaya Fujimoto, Osaka (JP); Kazuhiro Kobayashi, Osaka (JP)

(73) Assignee: TOYO TIRE & RUBBER CO., LTD., Osaka (JP)

( * ) Notice: Subject to any disclaimer, the term of this patent is extended or adjusted under 35 U.S.C. 154(b) by 0 days.

(21) Appl. No.: 15/491,358

(22) Filed: Apr. 19, 2017

(65) Prior Publication Data
US 2017/0313007 A1    Nov. 2, 2017

(30) Foreign Application Priority Data

Apr. 27, 2016    (JP) .................................. 2016-089785

(51) Int. Cl.
| | |
|---|---|
| *B32B 41/00* | (2006.01) |
| *B29D 30/38* | (2006.01) |
| *B29D 30/30* | (2006.01) |
| *B29D 30/46* | (2006.01) |
| *B26D 1/03* | (2006.01) |
| *B65H 35/02* | (2006.01) |

(Continued)

(52) U.S. Cl.
CPC .............. *B29D 30/38* (2013.01); *B26D 1/035* (2013.01); *B29D 30/3007* (2013.01); *B29D 30/46* (2013.01); *B65H 35/02* (2013.01); *B26D 2001/008* (2013.01); *B29D 2030/381* (2013.01); *B29D 2030/466* (2013.01); *B29K 2105/246* (2013.01)

(58) Field of Classification Search
CPC ..................... B29K 2105/246; B29B 15/122
USPC ..................... 156/64, 350, 351, 378, 379
See application file for complete search history.

(56) References Cited

U.S. PATENT DOCUMENTS

| | | |
|---|---|---|
| 1,452,379 A | 4/1923 | Haren et al. |
| 2005/0048857 A1 | 3/2005 | Terschueren et al. |

(Continued)

FOREIGN PATENT DOCUMENTS

| | | |
|---|---|---|
| DE | 2314889 A1 | 10/1974 |
| DE | 2433288 A1 | 2/1975 |

(Continued)

OTHER PUBLICATIONS

Extended European Search Report dated Sep. 4, 2017, issued in Application No. 17167144.9 (corresponding to U.S. Appl. No. 15/491,416).

(Continued)

*Primary Examiner* — Michael N Orlando
*Assistant Examiner* — Joshel Rivera
(74) *Attorney, Agent, or Firm* — Westerman, Hattori, Daniels & Adrian, LLP

(57) ABSTRACT

A topping sheet forming method includes: a division step of cylindrically winding a textile original fabric, obtained by weaving longitudinally aligned tire cords into a cord fabric by use of weft yarns, to form an original fabric roll and cutting off the weft yarns in predetermined widthwise positions by using a wire wound on the original fabric roll in a predetermined winding angle range to divide the textile original fabric into narrow textile original fabrics; and a topping step of topping at least one surface of each of the narrow textile original fabrics with unvulcanized rubber.

9 Claims, 9 Drawing Sheets

(51) Int. Cl.
  *B29K 105/24*  (2006.01)
  *B26D 1/00*  (2006.01)

(56) References Cited

U.S. PATENT DOCUMENTS

2009/0249597 A1    10/2009  Tatara et al.
2009/0249598 A1*   10/2009  Tatara .................... B29C 43/24
                                                          28/212
2016/0001502 A1    1/2016   Urabe

FOREIGN PATENT DOCUMENTS

| EP | 1226925 A1   | 7/2002 |
| JP | H07070869 A  | 3/1995 |
| JP | 2011073439 A | 4/2011 |
| JP | 2012-161969 A | 8/2012 |
| WO | 2007007405 A1 | 1/2007 |

OTHER PUBLICATIONS

Extended European Search Report dated Sep. 1, 2017, issued in Application No. 17167137.3 (corresponding to U.S. Appl. No. 15/491,360).

* cited by examiner

METHOD OF FORMING TOPPING SHEET AND APPARATUS THEREOF

CROSS-REFERENCE TO RELATED APPLICATIONS

This application claims priority of Japanese Patent Application No. 2016-89785 filed on Apr. 27, 2016, the content of which is incorporated herein by reference.

BACKGROUND OF THE INVENTION

Technical Field

The present invention relates to a method of forming a topping sheet and an apparatus thereof.

Related Art

For forming carcass ply that makes a skeleton of a pneumatic tire, first, a textile original fabric, obtained by weaving longitudinally aligned tire cords into a cord fabric by use of weft yarns, is prepared and then topped with unvulcanized rubber to form a topping sheet. Subsequently, the topping sheet is cut off into a length corresponding to a width of the carcass ply to form strip-shaped ply pieces. Further, non-cut ends of these ply pieces are sequentially connected to form a long ply original fabric. Then, the ply original fabric is wound around a molding drum to be expanded outer-diametrically and molded by vulcanization in a tire vulcanizing mold, thereby forming carcass ply.

Each carcass ply has a different width depending on the size and specification of the pneumatic tire, and the ply original fabric is formed for each carcass ply. The ply original fabric is once stored in a wound state as an intermediate molded article (intermediate work-in-process) and is then released and supplied at the time of molding the corresponding pneumatic tire. This leads to complex production control on the ply original fabric. In order to facilitate the production control on the ply original fabric, it has been proposed that the ply original fabric be directly supplied to a molding step without being stored as the intermediate molded article (e.g., WO2007/007405).

The direct supply of the ply original fabric to the molding step requires a compact configuration of an apparatus for forming the ply original fabric because of constraint on equipment arrangement space. For this reason, the topping sheet has been configured to have a width as narrow as about 0.5 m, for example.

However, the topping sheet is typically formed of a wide textile original fabric having a width of about 1.4 m to 1.5 m. That is, a narrow topping sheet has been formed by first topping a wide textile original fabric with the unvulcanized rubber to form a wide topping sheet, and then dividing this sheet widthwise. Another method has also been proposed where tire cords are supplied from a large number of cord bobbins to form a narrow cord original fabric, and this is topped with the unvulcanized rubber to form a narrow topping sheet (e.g., Japanese Unexamined Patent Application Publication No. 2012-161969).

SUMMARY

However, in the former method, since the wide topping sheet is topped with the unvulcanized rubber, dividing this sheet widthwise is not easy. Further, a calender line that makes topping with the unvulcanized rubber increases in size widthwise in accordance with the wide textile original fabric. Meanwhile, in the latter method, a calender unit can be reduced in size, but it takes labor to set the large number of cord bobbins. In short, it has not been possible to efficiently form the narrow topping sheet.

Accordingly, an object of the present invention is to efficiently form a narrow topping sheet.

As means to solve the above problem, the present invention provides a topping sheet forming method that includes: a division step of cylidrically winding a textile original fabric, obtained by weaving longitudinally aligned tire cords into a cord fabric by use of weft yarns, to form an original fabric roll and cutting off the weft yarns in predetermined widthwise positions by using a wire wound on the original fabric roll in a predetermined winding angle range to divide the textile original fabric into narrow textile original fabrics; and topping step of topping at least one surface of each of the narrow textile original fabrics with unvulcanized rubber.

According to the above, the wire can be disposed between adjacent tire cords, and along these tire cords. It is thus possible to reliably cut off only the weft yarns by the wire.

In the division step, a winding angle of the wire is preferably changed in accordance with an outer diameter dimension of the original fabric roll.

According to the above, the wire with constant fixed tensile force can be acted on the weft yarns, to hold a stable cut-off state.

In the division step, both ends of the wire ay be lifted or lowered to change the winding angle.

In the division step, the textile original fabric is preferably cut off based on tensile force that is generated by a weight attached to one end of the wire.

According to the above, the tensile force of the wire can be automatically adjusted while the method is simple.

In the division step, each of the positions for cutting off the weft yarns by the wire is preferably within a feeding position.

According to the above, the weft yarns protrude from the remaining textile original fabric which is left due to the cut-off by the wire, thus enabling prevention of the tire cords on the remaining textile original fabric side from being located below the textile original fabric having been fed by the tire cord.

The division step is preferably a feeding and division step that further includes a feeding step of feeding the divided narrow textile original fabrics to the topping step.

According to the above, the textile original fabric can be fed and divided simultaneously, thus eliminating the need for the cord original fabric preparing step of previously preparing the narrow textile original fabric, and enabling the narrow textile original fabric to be directly supplied from the textile original fabric and topped with the unvulcanized rubber. Thereby, equipment for the cord original fabric preparing step becomes unnecessary, and it is thus possible to achieve the space saving, and efficiently form the narrow topping sheet, while reducing production cost.

There may be provided a wind-up step of winding up the narrow textile original fabric obtained by the division step. In the topping step, the narrow textile original fabric obtained by the wind-up step may be fed, to be topped with the unvulcanized rubber.

The textile original fabric may be fed by detecting widthwise displacement of the textile original fabric being fed, and moving the textile original fabric widthwise so as to eliminate the detected displacement.

According to the above, it is possible to feed the textile original fabric while preventing widthwise displacement, and appropriately carry out the subsequent topping step, and the like.

As means to solve the above problem, the present invention provides a topping sheet forming apparatus that includes: a division part for cylidrically winding a textile original fabric, obtained by weaving longitudinally aligned tire cords into a cord fabric by use of weft yarns, to form an original fabric roll and cutting off the weft yarns in predetermined widthwise positions by using a wire wound on the original fabric roll in a predetermined winding angle range to divide the textile original fabric into narrow textile original fabrics; and a topping part for topping at least one surface of each of the narrow textile original fabrics with unvulcanized rubber.

According to the present invention, since the wire is used for dividing the textile original fabric, the wire can be disposed between adjacent tire cords, and along these tire cords. It is thus possible to reliably cut off only the weft yarns by the wire. Consequently, the obtained narrow textile original fabric is used to efficiently perform the subsequent formation of the topping sheet.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Hereinafter, an embodiment according to the present invention is described in accordance with the attached drawings. Note that the following description is merely illustrative in nature and is not intended to limit the present invention, the application thereof, or the uses thereof. The drawings are made schematically, with dimensional ratios and the like different from actual ones.

A carcass ply forming step according to one embodiment of the present invention is carried out by a cord original fabric preparing step, a calender step, a ply original fabric forming step, and a molding step. In the cord original fabric preparing step, a wide textile original fabric 100L is divided widthwise to form narrow textile original fabrics 100S. In the calender step, at least one surface of the narrow textile original fabric 100S is topped with unvulcanized rubber to create a topping sheet. In the ply original fabric forming step, the topping sheet is cut off into a length corresponding to a width of the carcass ply to form strip-shaped ply pieces. Further, non-cut ends of these ply pieces are sequentially connected to form a long ply original fabric. In the molding step, the ply original fabric is wound around a molding drum to be expanded outer-diametrically and molded by vulcanization in a tire vulcanizing mold, thereby forming carcass ply.

The present invention is characterized in a method for dividing widthwise the wide textile original fabric 100L into the narrow textile original fabrics in the cord original fabric preparing step. Hereinafter, the cord original fabric preparing step will be described in detail, the calender step and the ply original fabric forming step will be described briefly, and ad description of the molding step will be omitted.

Cord Original Fabric Preparing Step

Figure 1:
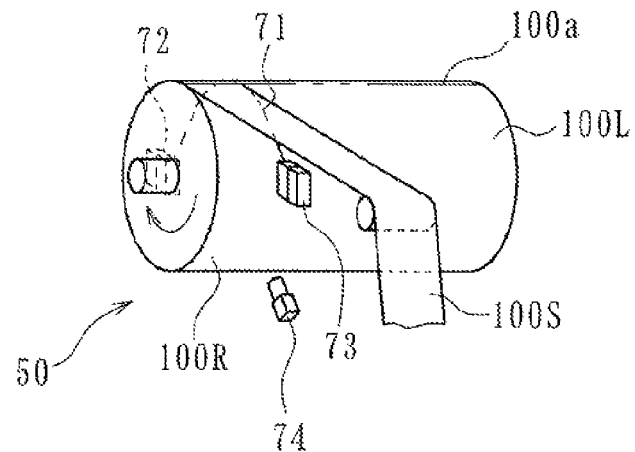
FIG. 1 is a perspective view schematically showing a slitter unit.
Figure 2:
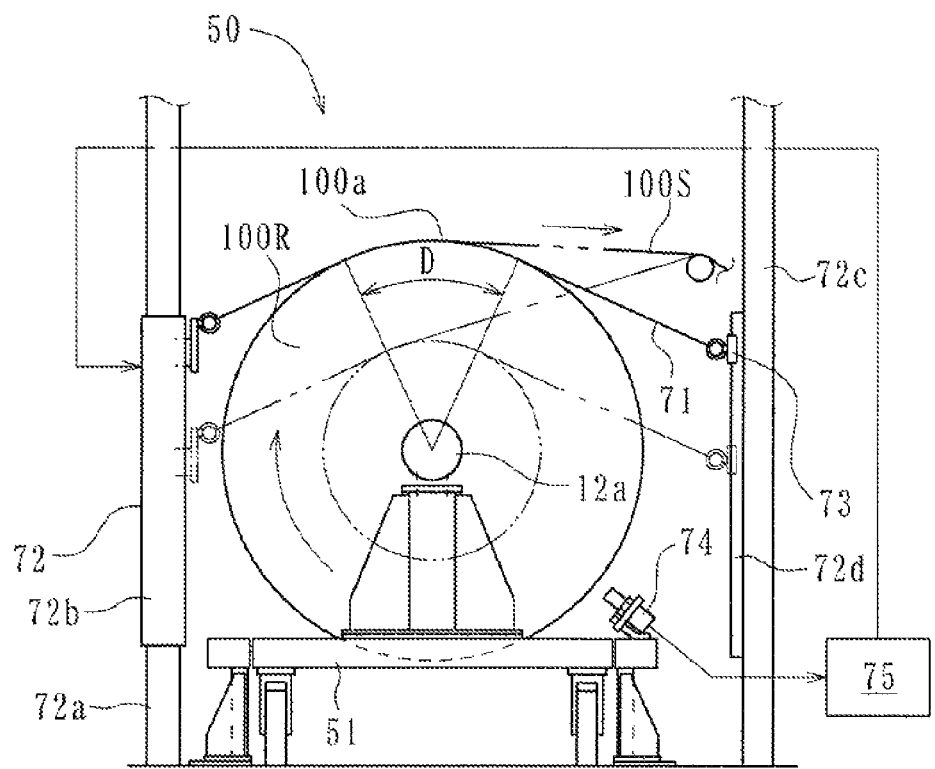
FIG. 2 is a main-part side view of FIG. 1.
Figure 3:
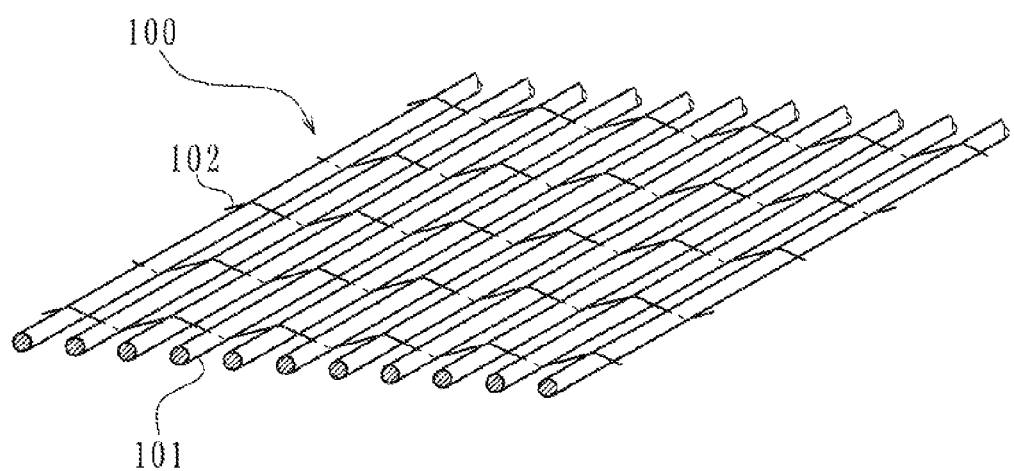
FIG. 3 is a perspective view schematically showing a textile original fabric.
Figure 4:
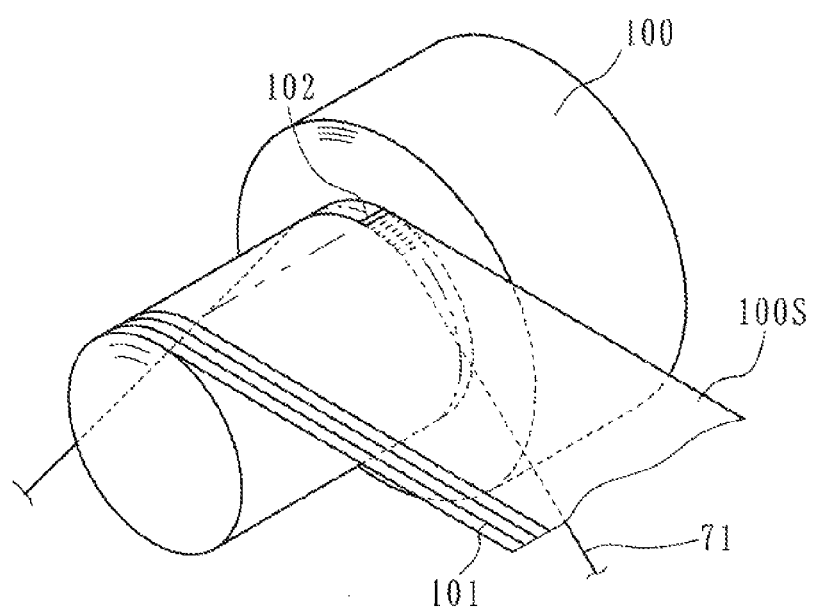
FIG. 4 is a schematic perspective view showing a state where an original fabric roll is cut off by a wire and a narrow textile original fabric is fed.

FIGS. 1 and 2 show a slitter unit 50 being one example of a division part for carrying out the cord original fabric preparing step. This slitter unit 50 includes a cart 51 that holds an original fabric roll 100R formed by cylindrically winding the textile original fabric 100. As shown in FIG. 4, the textile original fabric 100 is configured as a cord fabric woven by using as warps a plurality of longitudinally aligned tire cords 101 and providing weft yarns 102 as wefts at each required longitudinal interval. As the textile original fabric 100, there is typically used a textile original fabric formed to be so wide as to have a width of about 1.4 m to 1.5 m.

A lifting unit 72 is provided on one end side of the cart 51 (the opposite side from the feeding direction). In the lifting unit 72, a moving body 72b is liftably provided with respect to a first support 72a, and this moving body 72b is made liftably operable by drive means, not shown. A second support 72c is provided on the other end side (the feeding-direction side) of the cart 51. The second support 72c is provided with a rail 72d, to which a weight 73 is liftably fitted. The moving body 72b and the weight 73 are coupled through the wire 71. The wire 71 is wound on the original fabric roll 100R in a predetermined winding angle range D. The wire 71 is disposed in parallel with the tire cord 101 of the original fabric roll 100R, and is located between adjacent tire cords 101.

The cart 51 is provided with an outer diameter detecting unit 74 that detects an outer diameter of the original fabric roll 100R, and its detection signal is inputted into a control unit 75 (cf. FIG. 2). The control unit 75 drives and controls the lifting unit 72 based on the inputted detection signal. That is, the control unit 75 drives and controls the lifting unit 72 so as to hold the predetermined winding angle range D for the wire 71 based on the outer diameter of the original fabric roll 100R, which has been detected by the outer diameter detecting unit 74.

Specifically, as shown by chain double-dashed lines in FIG. 2, when the outer diameter of the original fabric roll 100R is reduced in association with feeding of the textile original fabric 100, the moving body 72b of the lifting unit 72 is lowered to hold a predetermined winding angle D of the wire 71. Moreover, a state is held where fixed tensile force is applied to the wire 71 by the weight 73. Accordingly, even when the outer diameter dimension of the original fabric roll 100R gradually decreases, it is possible to cause the wire 71 to flexibly follow the outer circumference of the original fabric roll 100R.

Meanwhile, the winding angle range D described above is set so as to include a feeding part 100a that feeds the wide textile original fabric 100L from the original fabric roll 100R. The predetermined winding angle range D is preferably set in a winding angle range of not smaller than 45 degrees and not larger than 60 degrees, and more preferably set in an angle range with the feeding part 100a taken as a substantially center value. The feeding part 100a here is located at the upper end of the original fabric roll 100R, and the winding angle range D for the wire 71 is set to an equivalent range on the right and left with the upper end taken as the center, in a side view of FIG. 2.

That is, the weft yarns 102 of the wide textile original fabric. 100L being fed from the original fabric roll 100R are cut off by the wire 71 and divided into the narrow textile original fabrics 100S in the feeding part 100a. Even when the tire cord 101 is displaced widthwise, the wire 71 can be reliably disposed between adjacent tire cords 101, thus causing no damage on the tire cords 101. That is, the use of the wire 71 enables division of the wide textile original fabric 100L into the narrow textile original fabrics 100S without damaging the tire cord 101. The narrow textile original fabric 100S here is formed to have a width dimension of about 0.45 m to 0.5 m.

As shown in FIG. 4, the position where the weft yarns 102 are cut off by the wire 71 is within the width dimension of the narrow textile original fabric 100S. This can bring the remaining portion after the cut-off and feeding into a state where the weft yarns 102 protrude laterally to the tire cord 101. Hence it is possible to prevent the tire cord 101 from being displaced laterally and falling or attaching to a winding layer formed by winding on the inner diameter side.

In place of the outer diameter detecting unit 74, the change in outer diameter of the original fabric roll 100R may be estimated based on an amount of feeding from the original fabric roll 100R. For example, by measuring the change in weight of the original fabric roll 100R (which may include a weight of the cart 51), the amount of the wide textile original fabric 100L fed from the original fabric roll, 100R may be calculated, to estimate the outer diameter of the original fabric roll 100R.

Figure 5:
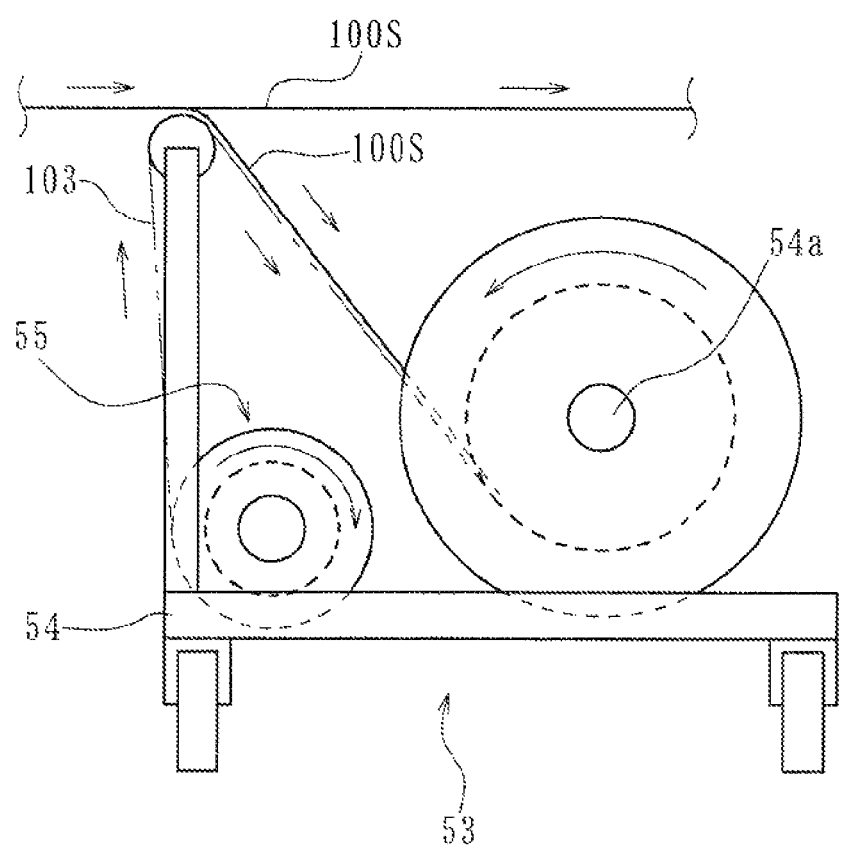
FIG. 5 is a main-part side view showing an original fabric wind-up part of the narrow textile original fabric divided by the slitter unit of FIG. 1.

As shown in FIG. 5, the divided narrow textile original fabric 100S is wound up in the narrow original fabric wind-up part 53. The narrow original fabric wind-up part 53 includes a roll 54a for winding up the narrow textile original fabric 100S and a film supplying unit 55 on a cart 54 (this may be the cart 51). The film supplying unit 55 supplies a film member 103 in association with wind-up of the narrow textile original fabric 100S. Hence the narrow textile original fabric 100S is wound around the roll 54a together with the film member 103. The film member 103 is configured to have a width equivalent to or larger than that of the narrow textile original fabric 100S. This prevents the narrow textile original fabric 100S in the wound state from falling and/or attaching to the winding layer on the inner diameter side.

Calender Step

Figure 6:
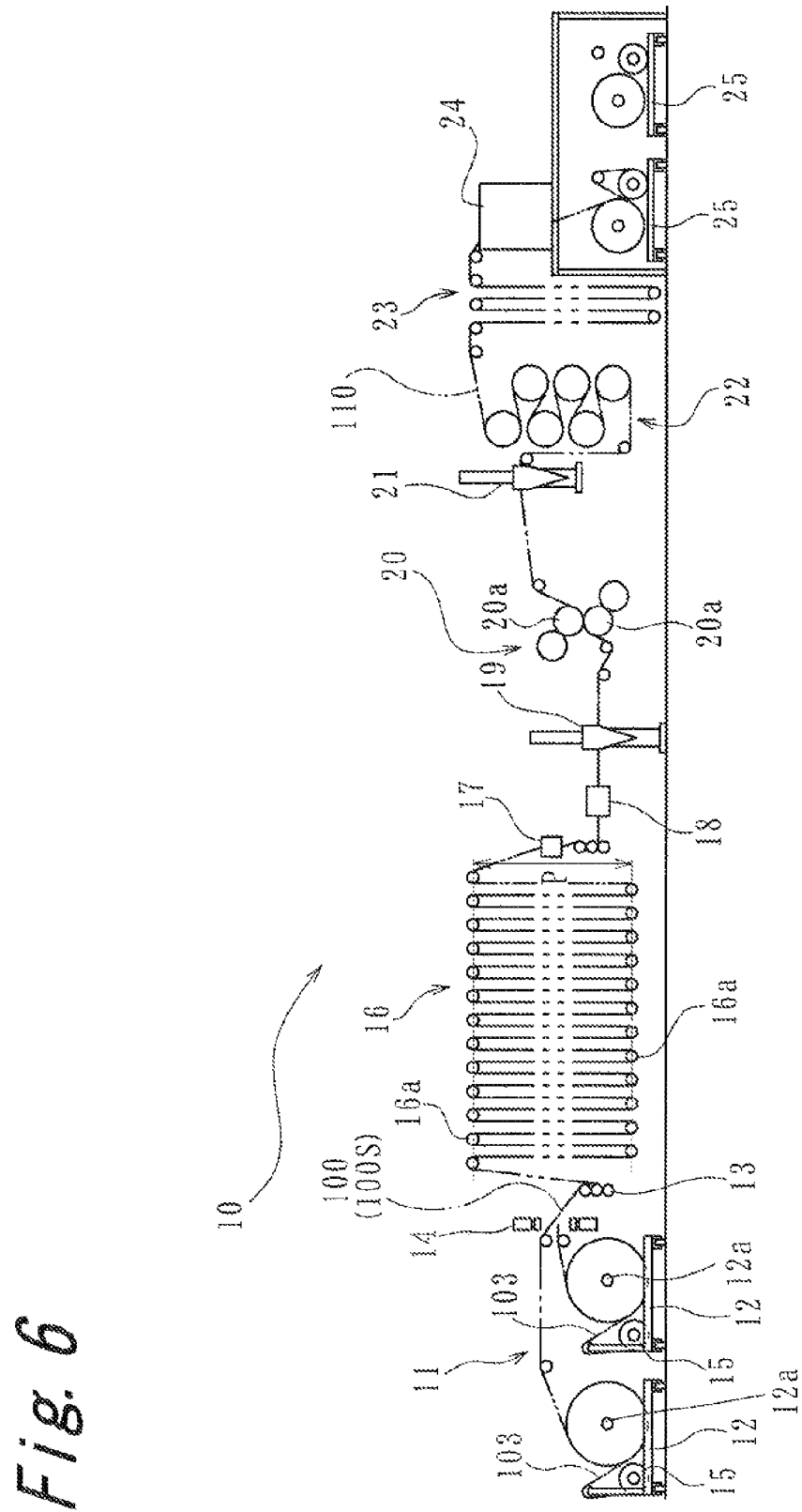
FIG. 6 is a view schematically showing a calender line.

FIG. 6 shows a schematic configuration of a calender line 10 for carrying out the calender step.

In the calender line 10, a supply part 11 for the narrow textile original fabric 100S, a calender unit 20, and a topping sheet wind-up unit 24 are provided in this order from the upstream (the left side in the figure) in the carrying direction.

The supply part 11 feeds the narrow textile original fabric 100S downstream (to the right side in the figure). The calender unit 20 tops at least one surface of the narrow textile original fabric 100S, having been fed, with unvulcanized rubber. The topping sheet wind-up unit 24 cylindrically winds up the narrow textile original fabric 100S topped with the unvulcanized rubber to the wind-up cart 25.

In the supply part 11, two carts 12, 12 are provided in parallel in the feeding direction of the textile original fabric 100. On a roll 12a of each of the carts 12, 12, the narrow textile original fabric 100S is held in the cylindrically wound state. Each of the carts 12, 12 is provided with a film wind-up unit 15. The film wind-up unit 15 winds up the film member 103 being wound together with the narrow textile original fabric 100S at the time of feeding of the textile original fabric 100.

The feeding unit 13 is disposed downstream from the carts 12, 12. The feeding unit 13 feeds the narrow textile original fabric 100S of either one of the carts 12, 12.

Figure 7A:
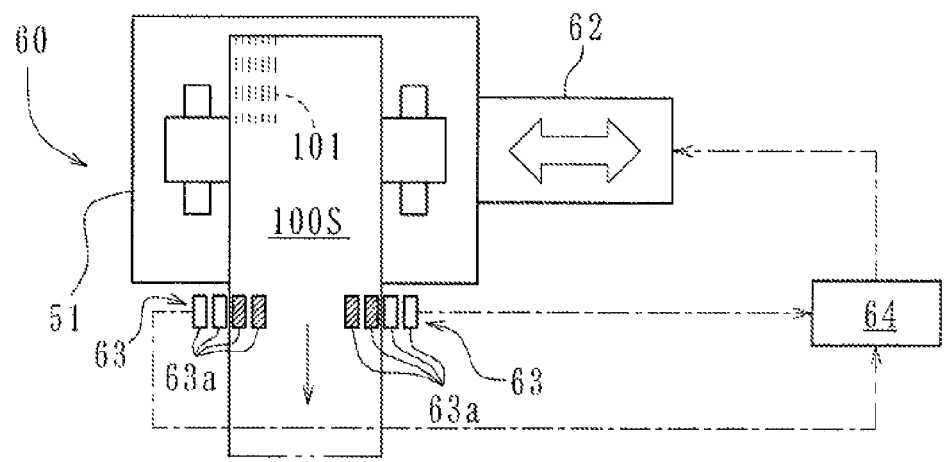
FIG. 7A is a plan view schematically showing the slitter unit of FIG. 1.

As shown in FIG. 7A, in order to correct displacement of the narrow textile original fabric 100S, fed from the cart 12, from a regular position, the supply part 11 further includes a cart moving unit 62 that moves the cart 12 widthwise, a detection device 63 that detects the widthwise position of the end of the narrow textile original fabric 100S being fed from the cart 51, and a control unit 64 that operates the cart moving unit 62 based on the detection result of the detection device 63.

The cart moving unit 62 is configured such that rotationally driving a ball screw, for example, can move the cart 12 to a desired widthwise position of the narrow textile original fabric 100S.

The detection device 63 is made up of a plurality of photoelectric tubes 63a provided in parallel widthwise in the vicinities of the ends. In the present embodiment, four photoelectric tubes 63a are provided in parallel widthwise in the vicinity of each of the widthwise ends.

The control unit 64 includes a displacement detecting part that detects a widthwise displacement amount Z (cf. FIG. 7A) of the end of the narrow textile original fabric 100S based on the detection result of the detection device 63, and a driving controlling part that drives and controls the cart moving unit 62. On the basis of the detection result of the detection device 63, namely the detection results of the plurality of photoelectric tubes 63a, the displacement detecting part detects the widthwise displacement amount Z of the end of the narrow textile original fabric 100S. The driving controlling part drives and controls the cart moving unit 62 so as to move the cart 12 widthwise along the narrow textile original fabric 100S based on the widthwise displacement amount Z of the narrow textile original fabric 100S which has been detected by the displacement detecting part, so as to eliminate the displacement.

Figure 7B:
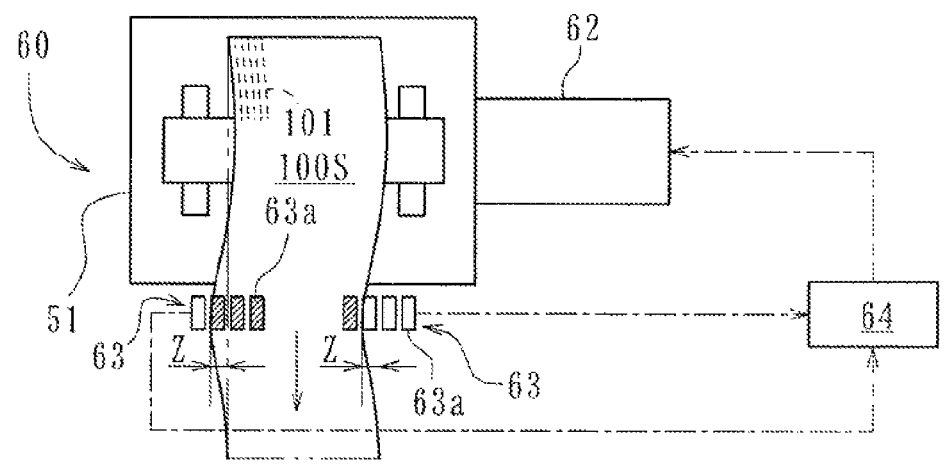
FIG. 7B is a plan view showing an example of a state where a narrow textile original fabric of FIG. 7A has been displaced.

For example, as shown in FIG. 7B, when three widthwise inner-end photoelectric tubes 63a of the photoelectric tubes 63a on the left side of the plurality of photoelectric tubes 63a detect the narrow textile original fabric 100S and one widthwise inner-end photoelectric tube 63a of the photoelectric tubes 63a on the right side of the above photoelectric tubes 63a detects the narrow textile original fabric 100S as shown by hatching in the figure, the displacement detecting part detects that the narrow textile original fabric 100S fed from the cart 12 is being fed to a widthwise biased position (on the left in the figure) by the displacement amount Z. In FIG. 7B, symbol Z denotes an amount of displacement with respect to the narrow textile original fabric 100S being fed to the widthwise center.

Figure 7C:
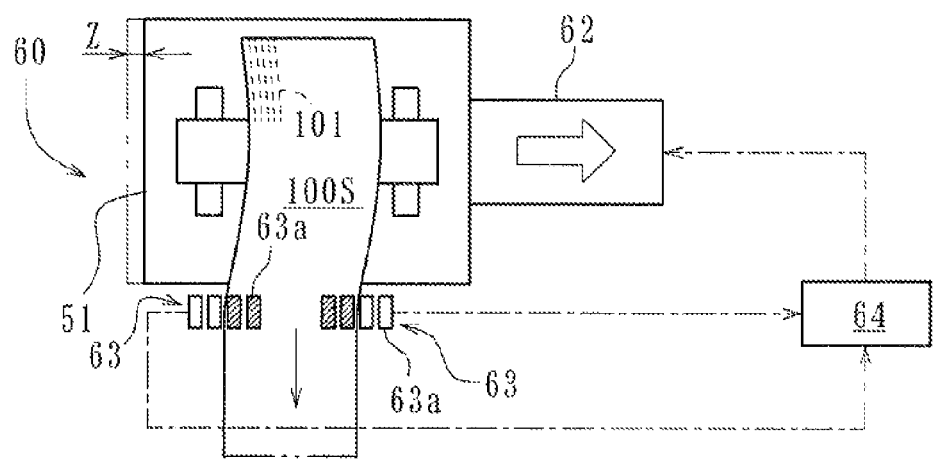
FIG. 7C is a plan view showing a state after the displacement of the narrow textile original fabric of FIG. 7B has been corrected.

In this case, a driving controlling part 642 drives and controls the cart moving unit 62 so as to eliminate the widthwise displacement of the narrow textile original fabric 100S being fed. That is, the driving controlling part drives and controls the cart moving unit 62 so as to move the cart 12 by the displacement amount Z in the direction (to the right in the figure) opposite to the displacement direction (the left in the figure), so as to eliminate the displacement of the narrow textile original fabric 100S. The cart 12 is thus moved to the right by the displacement amount Z as shown in FIG. 7C, thereby eliminating the widthwise displacement and centering the narrow textile original fabric 100S fed from the cart 12.

As thus described, the narrow textile original fabric 100S is fed while the widthwise displacement thereof is prevented, and then carried downstream in the calender line 10 while being divided widthwise. It is thus possible to appropriately top the narrow textile original fabric 100S prevented from varying widthwise.

As shown in FIG. 6, the feeding unit 13 is provided downstream from the supply part 11. The feeding unit 13 feeds the first narrow textile original fabric 100S, supplied from the supply part 11, downstream from the calender line 10. A junction unit 14 is provided between the supply part 11 and the feeding unit 13. When a terminal end of the narrow textile original fabric 100S being fed from the cart 12 comes out, the junction unit 14 joins this terminal end with a starting end of the narrow textile original fabric 100S wound up to any of the original fabric wind-up parts 41. This enables the narrow textile original fabric 100S to be fed successively.

A first festoon unit 16 is provided downstream from the feeding unit 13. The first festoon unit 16 includes a plurality of vertically disposed rollers 16a, and the plurality of rollers 16a are configured with vertical pitches P1 being variable. The textile original fabric 100 is wound on the plurality of rollers 16a in a vertically alternate manner. That is, the first festoon unit 16 can make a carrier path longer by extending the pitch P1, to store a required amount of the narrow textile original fabric 100S as a buffer. The first festoon unit 16 can make the carrier path shorter by shortening the pitch P1, to supply the narrow textile original fabric 100S downstream from the buffer.

That is, when the feeding of the narrow textile original fabric 100S is to be temporarily stopped in the supply part 11, the first festoon unit 16 supplies downstream the narrow textile original fabric 100S stored as the buffer. Namely, a decrease in operating rate of the calender line 10 can be prevented by keeping the calender line 10 from stopping.

A centering unit 17, a weft yarn removing unit 18, and a first dancer unit 19 are provided in this order downstream from the first festoon unit 16. The centering unit 17 adjusts a widthwise position of the narrow textile original fabric 100S to the center. The weft yarn removing unit 18 divides the weft yarns 102 of the narrow textile original fabric 100S and removes them from the tire cords 101. The first dancer unit 19 adjusts a path length of the narrow textile original fabric 100S with the weft yarns removed therefrom.

The calender unit 20 is provided downstream from the first dancer unit 19. The calender unit 20 allows passage of the plurality of tire cords 101 between a pair of calender rolls 20a, 20a, to top at least one surface of the tire cord 101 with the unvulcanized rubber.

A second dancer unit 21 and the cooling unit 22 are provided in this order downstream from the calender unit 20. A topping sheet 110 obtained by topping with the unvulcanized rubber in the calender unit 20 passes through the second dancer unit 21 and is then cooled by the cooling unit 22.

A second festoon unit 23 and a topping sheet wind-up unit 24 are provided in this order downstream from the cooling unit 22. Two wind-up carts 25, 25 are disposed in the topping sheet wind-up unit 24, and the topping sheet 110 carried through the second festoon unit 23 is alternately wound up to the two carts 25. Note that the second festoon unit 23 ensures the buffer at the time of switching the cart 25, to prevent stoppage of the calender line 10.

Ply Original Fabric Forming Step

Figure 8:
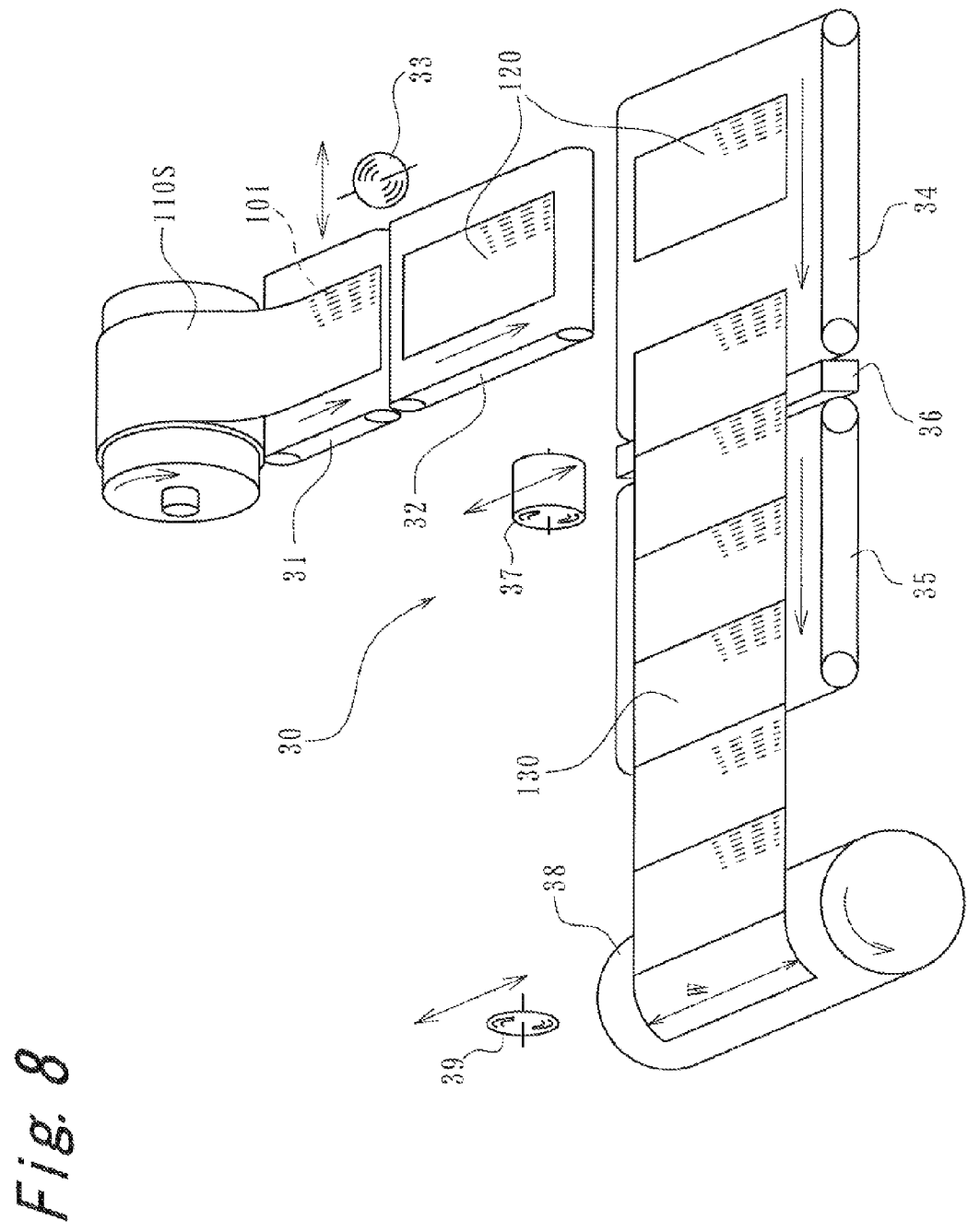
FIG. 8 is a view schematically showing a ply original fabric forming step.

FIG. 8 schematically shows a ply original fabric forming line 30 where the ply original fabric forming step is carried out.

The first half of the ply original fabric forming line 30 is provided with a first conveyor 31 and a second conveyor 32 that feed the cylindrically wound topping sheet 110 with a predetermined length, and a first cutting unit 33 that moves widthwise between these conveyors. The latter half of the ply original fabric forming line 30 is provided with a third conveyor 34, a fourth conveyor 35, a coupling stage 36 located between these conveyors, and a pressing unit 37 movable widthwise on the coupling stage 36.

That is, in the first half of the ply original fabric forming line 30, the topping sheet 110 with the predetermined length is fed by the first and second conveyors 31, 32, and then cut off by the first cutting unit 33 into strip-shaped ply pieces 120. The predetermined length is here set to a length corresponding to a width W of the carcass ply. In the present embodiment, the topping sheet 110 is cut off at an angle substantially orthogonal to the tire cord 101, but it may be cut off at an angle of about 75° to 90° with respect to the tire cord 101 so as to form carcass ply for a pneumatic radial tire.

Subsequently, the strip-shaped ply pieces 120 are transferred to the latter half of the ply original fabric forming line 30, and carried parallel to the direction of the cutting by the first cutting unit 33 (i.e., perpendicularly to the carrying direction in the first half) by the third and fourth conveyors 34, 35. At this time, the third and fourth conveyors 34, 35 operate such that a carrying-direction rear edge of the preceding ply piece 120 is butted with a carrying-direction front edge of the subsequent ply piece 120 on the coupling stage 36. The pressing unit 37 moves widthwise while the mutually facing edges of the sequentially carried ply pieces 120 are butted with each other on the coupling stage 36, to sequentially couple these ply pieces 120.

That is, the strip-shaped ply pieces 120 are cut off from the topping sheet 110, and the ply pieces 120 are sequentially coupled, to form the long ply original fabric 130. The ply original fabric 130 is directly supplied to the tire molding step without being wound up cylindrically, and is then wound on a molding drum 38. The ply original fabric 130 wound on the molding drum 38 is cut off by a second cutting unit 39 to have a length corresponding to a circumferential length of the tire.

Other Embodiments

Figure 9:
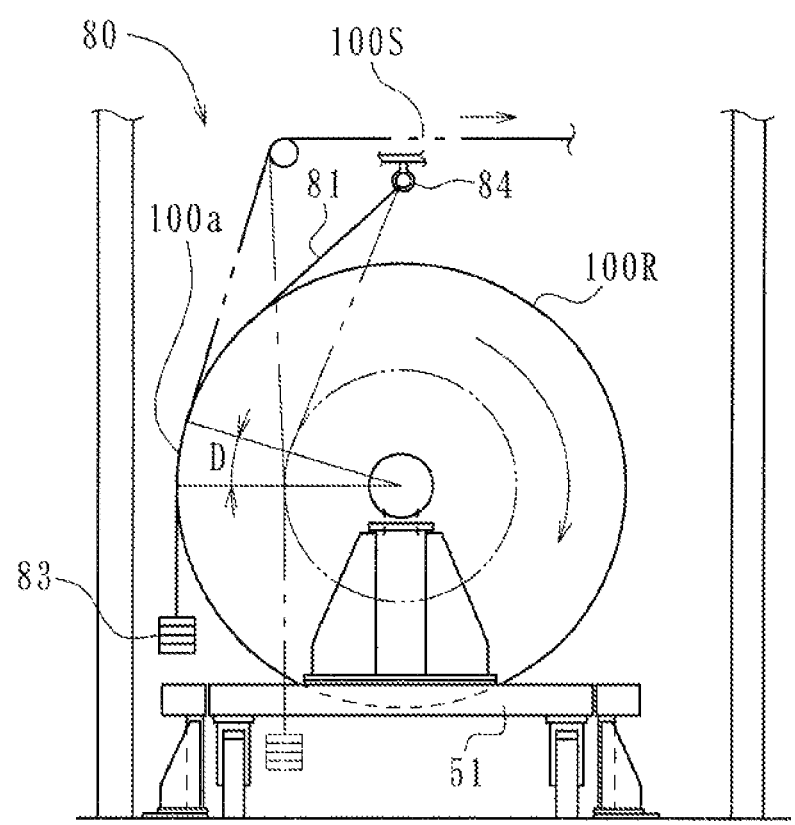
FIG. 9 is a main-part side view of a slitter unit according to another embodiment.

Note that the present invention is not limited to the configuration described in the above embodiment, but a variety of changes can be made, FIG. 9 shows a slitter unit 80 according to another embodiment. In this slitter unit 80, one end of the wire 81 is fixed to a supporting point 84 above the original fabric roll 100R, and the other end thereof is coupled with a weight 83. The wire 81 extends vertically while being wound on the side of the original fabric roll 100.R. This eliminates the need for the lifting unit 72, the outer diameter detecting unit 74, and the control unit 75 as in the slitter unit 50.

The feeding part 100a of the original fabric roll 100R is set so as to be located in a substantially center position of the winding angle range D for the wire 81. This eliminates the need for the lifting unit 72, the outer diameter detecting unit 74, and the control unit 75, and the wire 81 can be wound on the side of the feed position of the original fabric roll 100R without being influenced by the change in outer diameter of the original fabric roll 100R. That is, with the simple configuration, it is possible to stably divide the wide textile original fabric 100L into the narrow textile original fabrics 100S regardless of the change in outer diameter of the original fabric roll 100R, without causing damage on the tire cord 101.

In the above embodiment, the wide textile original fabric 100L is divided by the slitter unit 50, 80 into the narrow textile original fabrics 100S on each line at a time, but it may be divided simultaneously on a plurality of lines.

Figure 10:
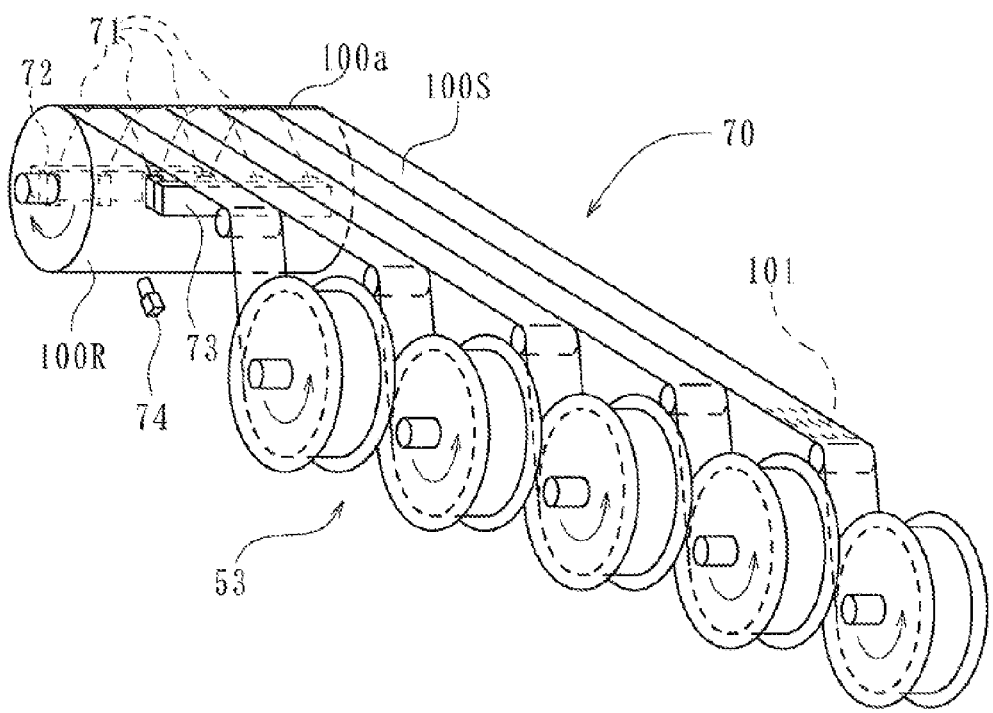
FIG. 10 is a perspective view schematically showing a slitter unit according to another embodiment.

For example, as shown in FIG. 10, it can be configured such that a plurality of narrow original fabric wind-up parts 53 wind up the divided narrow textile original fabrics 100S. In this case, though not shown in FIG. 10, the carts 54 are provided in accordance with the number of division of the plurality of divided narrow textile original fabrics 100S. In this example, since the textile original fabric is divided into five narrow textile original fabrics 1003, five carts 54 are provided and disposed at the respectively shifted positions in the feeding direction of the narrow textile original fabric 100S.

What is claimed is:

1. A topping sheet forming method comprising:
   a division step of cylindrically winding a textile original fabric, obtained by weaving longitudinally aligned tire cords into a cord fabric by use of weft yarns, to form an original fabric roll and cutting off the weft yarns in predetermined widthwise positions by use of a wire wound on the original fabric roll in a predetermined winding angle range to divide the textile original fabric into narrow textile original fabrics; and
   a topping step of topping at least one surface of each of the narrow textile original fabrics with unvulcanized rubber.

2. The topping sheet forming method according to claim 1, wherein in the division step, a winding angle of the wire is changed in accordance with an outer diameter dimension of the original fabric roll.

3. The topping sheet forming method according to claim 2, wherein in the division step, both ends of the wire are lifted or lowered to change the winding angle.

4. The topping sheet forming method according to claim 3, wherein in the division step, the textile original fabric is cut off based on tensile force that is generated by a weight attached to one end of the wire.

5. The topping sheet forming method according to claim 1, wherein in the division step, each of the positions for cutting off the weft yarns by the wire are within a feeding position.

6. The topping sheet forming method according to claim 1, wherein the division step is a feeding and division step that further includes a feeding step of feeding the divided narrow textile original fabrics to the topping step.

7. The topping sheet forming method according to claim 1, comprising
   a wind-up step of winding up the narrow textile original fabric obtained by the division step,
   wherein in the topping step, the narrow textile original fabric obtained by the wind-up step is fed to be topped with the unvulcanized rubber.

8. The topping sheet forming method according to claim 6,
   wherein the textile original fabric is fed by
   detecting widthwise displacement of the textile original fabric being fed, and
   moving the textile original fabric widthwise so as to eliminate the detected displacement.

9. A topping sheet forming apparatus comprising:
   a division part that cylindrically winds a textile original fabric, obtained by weaving longitudinally aligned tire cords into a cord fabric by use of weft yarns, to form an original fabric roll and cuts off the weft yarns in predetermined widthwise positions by using a wire wound on the original fabric roll in a predetermined winding angle range to divide the textile original fabric into narrow textile original fabrics; and
   a topping part that tops at least one surface of each of the narrow textile original fabrics with unvulcanized rubber.

* * * * *